United States Patent [19]

Joffe

[11] Patent Number: 5,842,025

[45] Date of Patent: Nov. 24, 1998

[54] ARBITRATION METHODS AND APPARATUS

[75] Inventor: Alexander Joffe, Palo Alto, Calif.

[73] Assignee: MMC Networks, Inc., Sunnyvale, Calif.

[21] Appl. No.: 708,140

[22] Filed: Aug. 27, 1996

[51] Int. Cl.$^6$ .................................................. G06F 13/14
[52] U.S. Cl. ......................... 395/728; 395/729; 395/287; 395/293
[58] Field of Search .................... 395/287, 299, 395/728, 730, 732, 301, 303, 293, 729, 860; 340/825.5

[56] References Cited

U.S. PATENT DOCUMENTS

| | | | |
|---|---|---|---|
| 4,320,457 | 3/1982 | Tanikawa | 395/294 |
| 4,373,181 | 2/1983 | Chisholm et al. | 364/200 |
| 4,481,579 | 11/1984 | Kinghorn | 364/200 |
| 4,663,756 | 5/1987 | Retterath | 370/85 |
| 4,791,562 | 12/1988 | Shima | 364/200 |
| 4,920,486 | 4/1990 | Nielsen | 395/291 |
| 4,961,140 | 10/1990 | Peehanek et al. | 395/285 |
| 5,101,482 | 3/1992 | Kipnis | 395/298 |
| 5,175,822 | 12/1992 | Dixon et al. | 395/275 |
| 5,193,197 | 3/1993 | Thaker | 395/303 |
| 5,237,696 | 8/1993 | Best | 395/299 |
| 5,263,163 | 11/1993 | Holt et al. | 395/730 |
| 5,416,910 | 5/1995 | Moyer et al. | 395/293 |
| 5,437,019 | 7/1995 | Brockmann | 395/400 |
| 5,551,053 | 8/1996 | Nadolski et al. | 395/829 |
| 5,615,106 | 3/1997 | Yoshino et al. | 364/140 |
| 5,623,672 | 4/1997 | Popat | 395/728 |
| 5,636,342 | 6/1997 | Jeffries | 395/185.01 |
| 5,640,594 | 6/1997 | Gibson et al. | 395/829 |
| 5,664,221 | 9/1997 | Amberg et al. | 395/829 |

FOREIGN PATENT DOCUMENTS

| | | |
|---|---|---|
| 1 320 281 A | 7/1993 | Canada . |
| 0 374 521 A | 6/1990 | European Pat. Off. . |
| 0 450 233 A | 10/1991 | European Pat. Off. . |
| 0 476 990 A | 3/1992 | European Pat. Off. . |
| 0 615 194 A | 9/1994 | European Pat. Off. . |

OTHER PUBLICATIONS

Shanley, T. et al., "PCI System Architecture", PC System Architecture Series, vol. 4 (MindShare, Inc. Press, Texas 1994), pp. 46, 95–114.

*Primary Examiner*—Gopal C. Ray
*Attorney, Agent, or Firm*—Skjerven, Morrill, MacPherson, Franklin & Friel LLP; Michael Shenker

[57] ABSTRACT

In the first period of time during arbitration, each unit requesting access to the bus examines two or more MSBs of its priority number, and indicates these bits by signals on the bus. Thus, the units are divided into groups based on two or more MSBs of the units' priority numbers; at the end of the first period of time, the bus identifies one of the groups which wins arbitration over the remaining groups. In a second period of time, the units of the winning group that request access to the bus examine the next bits of their priority numbers, and indicate these bits by signals on the bus. Thus, the units of the winning group are divided into subgroups based on the next bits of the priority numbers. At the end of the second period of time, the bus indicates the winning subgroup. Arbitration proceeds in this way until the winning unit is determined. The winning unit changes its priority to the lowest priority. All the units that had lower priority than the winning unit increase their priorities. Initial priority numbers are determined from the device numbers.

34 Claims, 2 Drawing Sheets

ARBITRATION METHODS AND APPARATUS

BACKGROUND OF THE INVENTION

The present invention relates to computers, and more particularly to resource sharing and device identification in computer systems.

Computer systems use various techniques to control access to shared resources. Access to a shared bus is sometimes controlled by an arbitrator circuit. The arbitrator receives a request signal from each unit wishing to access the bus. The arbitrator grants access to one of the units.

Systems using an arbitrator include a separate conductive line for a request signal from each unit. To reduce the number of conductive lines, some systems do not use an arbitrator. Instead, a single conductive line is connected to every unit that may access the bus. The connection is "wired-OR". This means that the conductive line is connected to a first voltage, and any unit can drive the line to a second voltage. In the explanation that immediately follows, the first voltage is a high voltage, and the second voltage is a low voltage; the conductive line is connected to the high voltage through a pull-up resistor.

Each unit is assigned a unique priority number. A lower priority number indicates a higher priority. Arbitration takes as many clock cycles as there are bits in the priority number. In the first clock cycle, each unit requesting bus access examines the most significant bit of its priority number. If this bit is 0, the unit pulls the conductive line low. If the bit is 1, the unit does not drive the conductive line. At the end of the clock cycle, all the units sample the voltage on the conductive line. If the conductive line is low, all the units whose most significant bit is 1 lose arbitration and do not participate in the remaining clock cycles. If the conductive line is high, all the units wishing to access the bus participate in the second clock cycle.

In the second clock cycle, each unit still participating in the arbitration examines the second most significant bit of its priority number. If this bit is 0, the unit pulls the conductive line low. If the bit is 1, the unit does not drive the conductive line. At the end of the cycle, all the units sample the voltage on the conductive line. Operation proceeds as in the previous cycle. On the last clock cycle, which corresponds to the least significant bit of the priority number, the arbitration winner is determined.

This technique requires only one conductive line, but arbitration takes longer. It is desirable to provide an arbitration technique that requires fewer conductive lines than in an arbitrator system but is faster than the single-conductive-line technique.

In the single-conductive-line technique, units with lower priorities have less opportunity to access the bus. There is a need for an arbitration technique that would provide equal bus access opportunities to units connected to the bus.

It is also desirable to reduce arbitration delays even in systems using an arbitrator or a single conductive line.

In many systems, different units ("devices") are identified by their device number. For some units, the device numbers are not "burned in" by the unit manufacturer, but rather are set when the units are mounted on a circuit board. Each unit has a number of pins reserved for the device number. When the unit is mounted, these pins are tied to high or low voltages according to the device number; each pin defines one bit of the device number. It is desirable to reduce the number of pins reserved for device numbers.

SUMMARY

The present invention provides in some embodiments fast arbitration techniques that require fewer conductive lines than arbitrator systems but are faster than single-conductive-line systems. In some embodiments including up to 15 units that share a bus, three conductive lines ("arbitration lines") are used for arbitration. The arbitration is twice faster than in a single-conductive-line system.

In these embodiments, each unit is assigned a unique 4-bit priority number. In the first clock cycle of the arbitration, each unit requesting bus access examines the two most significant bits (MSBs) of its priority number. The unit takes one of four possible actions with respect to the three arbitration lines, depending on the two most significant bits. For example, in some embodiments, a higher priority number indicates a lower priority, and the unit performs as follows. If the two most significant bits are 00, the unit asserts arbitration lines 0 and 1 (that is, the unit pulls lines 0 and 1 low). If the two most significant bits are 01, the unit asserts line 0. If the two most significant bits are 10, the unit asserts line 2. If the two most significant bits are 11 (the lowest priority), the unit does not drive any arbitration line.

As a result, at the end of the first clock cycle the three arbitration lines identify the two MSBs of the highest-priority unit requesting bus access. In effect, all units are divided into four groups based on the value of the two MSBs of the units' priority numbers. Each group has at most four units. At the end of the first clock cycle, the arbitration lines identify the group that includes the highest-priority unit requesting bus access. The other three groups lose arbitration and do not participate in the remaining clock cycles of the arbitration.

The second clock cycle is similar, but each unit remaining in the arbitration examines the next two bits of its priority number. Thus, the group that won the first clock cycle is divided into four subgroups based on these next two bits of the priority numbers. Each subgroup has at most one unit. At the end of the second clock cycle, a winning subgroup is selected similar to the first clock cycle. Therefore, the whole arbitration cycle consists of two clock cycles (compared to 4 clock cycles for a single-conductive line system with 4-bit priority numbers).

In some embodiments, the system contains other numbers of units or arbitration lines. In the first clock cycle of the arbitration, each unit requesting bus access provides to the arbitration lines an indication of the k1 most significant bits (MSBs) of its priority number, where k1>1. As a result, the arbitration lines identify the group of units that includes a highest-priority unit requesting bus access as determined by the k1 MSBs of the priority numbers. This group is subdivided into subgroups based on some number k2 of the next MSBs of the priority numbers. The arbitration continues similarly until the highest-priority unit requesting bus access is identified.

In some embodiments, the above-described clock cycles in the arbitration are separated by relaxation cycles in which the arbitration lines are restored to the high voltage.

In some embodiments, the unit winning arbitration changes its priority number to the lowest priority. All the units that had lower priority than the winning unit update their priority numbers by one to get higher priority. Therefore, all the units have equal opportunity to access the bus.

In some embodiments, to perform a high priority data transfer, a unit can take over the bus without participating in arbitration.

In some embodiments, the initial priority numbers are determined from the device numbers (DNs).

In some embodiments, the device numbers are assigned using a single pin ("DN pin") for each unit. The DN pin is connected to a separate line of the shared bus (DN pins of different units are connected to different bus lines). These bus lines are not dedicated to device number assignment but are also used for other purposes, for example, for data transfers. During initialization, a control circuit drives a unique device number on each bus line connected to a DN pin. Therefore, unique multi-bit device numbers are assigned using only one pin for each unit.

Another aspect of the present invention reduces arbitration delays by overlapping arbitration cycles with bus cycles. Thus, an arbitration cycle for a bus cycle proceeds in parallel with another bus cycle. This technique reduces arbitration delays in different arbitration systems including systems with arbitrators or with single arbitration lines.

In some embodiments, arbitration techniques control access to a shared resource other than a bus, for example, to a shared memory.

Other features and advantages of the invention are described below. The invention is defined by the appended claims.

DESCRIPTION OF PREFERRED EMBODIMENTS

Embodiments described below illustrate but do not limit the invention. The invention is defined by the appended claims.

Figure 1:
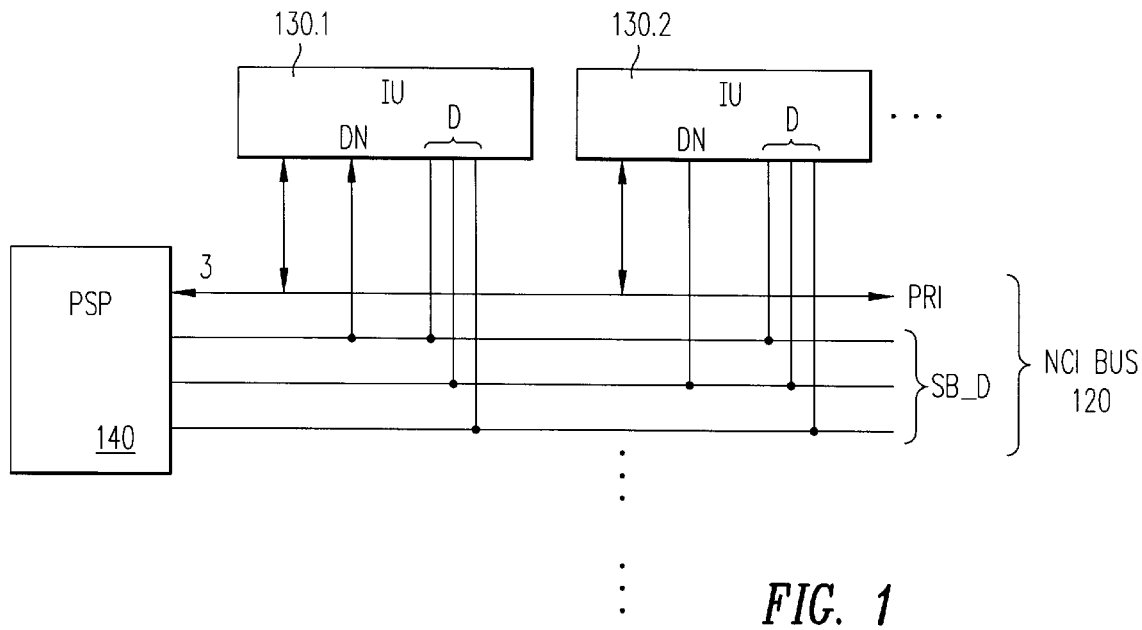
FIG. 1 is a block diagram of a computer system using bus arbitration according to the present invention.

FIG. 1 shows a computer system 110 which includes a shared bus 120. System 110 is a packet switch that interconnects different networks. Examples of such networks are Ethernet, FDDI, and ATM. In some embodiments, switch 110 is implemented using Packet Switch Engine chip set PS1000™ available from MMC Networks, Inc. of Santa Clara, Calif. See "PS1000 Application Note—Segment Bus Transactions" (MMC Networks, Inc., 1996, document MMC 96-0017) and "PS1000 Application Note—Segment Bus Arbitration Mechanism" (MMC Networks, Inc., 1996, document MMC 96-0010). Both documents are incorporated herein by reference.

Bus 120 is shared by interface units (IUs) 130.1, 130.2, and possibly other such units. Each unit 130.i is connected to one or more network segments. Bus 120 is also used by unit 140. Unit 140 is a packet switch processor (PSP) providing an interface between IUs 130 and a memory (not shown). In some embodiments, PSP 140 is connected to other PSPs (not shown). Bus 120 is called herein a Network Component Interconnect (NCI) bus. The lines of bus 120 are described in Addendum 1 at the end of this description (before the claims).

In a bus transfer, one of units 130, 140 is a bus master. One arbitration cycle is performed among units 130, 140 to select the bus master for a respective bus cycle.

PSP 140 is a bus master in two types of transfers on bus 120. The first type is a transfer of a burst of data initiated by an IU 130 in a Read transaction. A Read transaction involves data transfer from a memory (not shown) to an IU 130 via PSP 140 and bus 120. PSP 140 uses its Reply Channel for these transfers. This channel is able to acquire bus 120 whenever there is data pending. Therefore, this channel has the highest priority and does not participate in bus arbitration. When this channel requires an access to the bus, this channel asserts the signal SB_REQ_ (Addendum 1) to indicate to IUs 130 that PSP 140 will take over the next bus cycle.

The second type is a transfer initiated by PSP 140. In this transfer, PSP 140 sends a message from its Port Mailbox to all the ports. This transfer is done by the Message Channel of PSP 140. For this transfer, PSP 140 participates in bus arbitration as IUs 130.

Arbitration provides equal opportunity to all units 130, 140 (not taking into account the PSP 140 Reply Channel, which does not participate in arbitration as described above). Equal opportunity is provided as follows:

1. At any given time, each unit 130, 140 has a unique Priority Number (PN). In some embodiments, system 110 has at most 14 IUs, and the priority numbers range from 0 to 14. 0 is the highest priority and 14 is the lowest priority.
2. During an arbitration cycle, the unit with the lowest Priority Number (highest priority) wins and is allowed to be a master in a respective bus cycle. All the other units know who the winner is.
3. At the end of the arbitration cycle, the winning unit changes its Priority Number to 14 (lowest priority), and all the units with the priority number larger than the winner's number decrement their PNs.

Bus 120 includes a priority bus PRI (shown as SB_PRI in Addendum 1) consisting of three arbitration lines PRI[0], PRI[1], PRI[2]. Lines PRI[0:2] are connected to each unit 130, 140. The connection is wired-OR with pull up resistors (not shown). The pull up resistors maintain the arbitration lines at a high voltage unless a unit 130 or 140 drives an arbitration line low (to ground).

Figure 2:
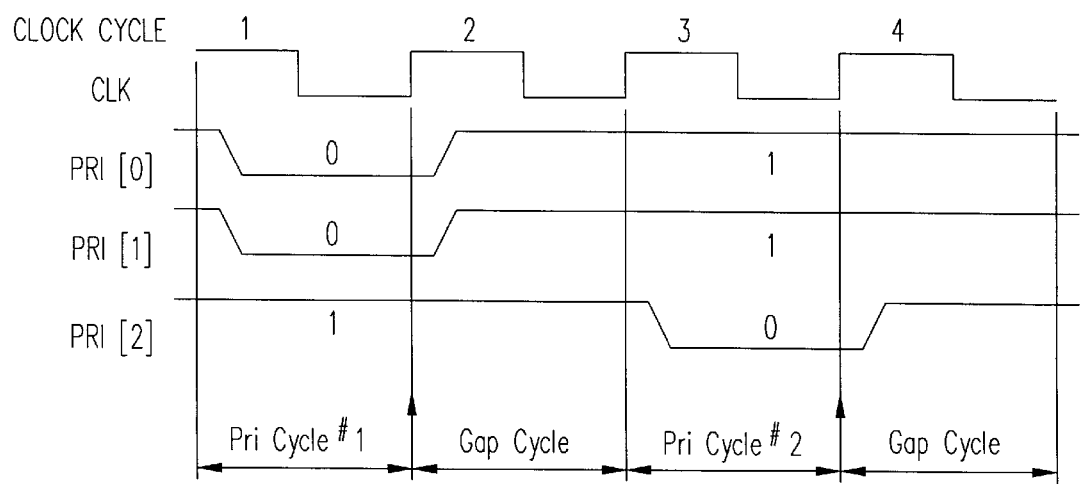
FIG. 2 is a timing diagram of an arbitration cycle in the system of FIG. 1.

In some embodiments, an arbitration cycle takes two clock cycles. In the embodiment of FIG. 2, an arbitration cycle takes four clock cycles. Cycles 2 and 4 are "relaxation" (or "gap") cycles. In the first half of each gap cycle, PSP 140 actively pulls the arbitration lines high. The gap cycles give the arbitration lines time to be pulled high even when the clock speed is high. Gap cycles are omitted in some embodiments if the clock speed is sufficiently low.

In clock cycle 1, each unit 130, 140 that requests access to bus 120 asserts PRI signals according to the two MSBs of the unit's priority number PN[3:0] as follows:

if (PN[3:2]=0), assert PRI[0] and PRI[1] (that is, pull PRI[0] and PRI[1] low);
if (PN[3:2]=1), assert PRI[0];
if (PN[3:2]=2), assert PRI[2];
if (PN[3:2]=3), do not assert any PRI signal.

Therefore, after clock cycle 1, a "winning" group of four units is selected according to the following Table 1:

TABLE 1

| After clock cycle 1 | | | |
|---|---|---|---|
| PRI[0] | PRI[1] | PRI[2] | Winning Group's PNs |
| 0 | 0 | x | 0–3 |
| 0 | 1 | x | 4–7 |
| 1 | x | 0 | 8–11 |
| 1 | x | 1 | 12–14 or none |

Of note, if PRI[1]=0 (low), then PRI[0] is "don't care", and PRI[1] is not asserted in some embodiments.

Only the winning group participates in the arbitration in clock cycle 3. In cycle 3, a winning unit is selected as follows. In the winning group, each unit (if any) that requests access to bus 120 assert the following PRI signals:

if (PN[1:0]=0), assert PRI[0] and PRI[1];

if (PN[1:0]=1), assert PRI[0];

if (PN[1:0]=2), assert PRI[2];

if (PN[1:0]=3), do not assert any PRI signals.

The results are summarized in the following table 2.

TABLE 2

| After clock cycle 3 | | | |
|---|---|---|---|
| PRI[0] | PRI[1] | PRI[2] | Winning PN |
| 0 | 0 | x | 0 (or 4, or 8, or 12) |
| 0 | 1 | x | 1 (or 5, or 9, or 13) |
| 1 | x | 0 | 2 (or 6, or 10, or 14) |
| 1 | x | 1 | 3 (or 7, or 11, or none) |

If PRI[1]=0, then PRI[0] is "don't care", and is not asserted in some embodiments.

In the example of FIG. 2, three units A, B and C are requesting bus access:

Unit A has the Priority Number of 12 (binary 1100).

B has the Priority Number of 2 (binary 0010).

Unit C has the Priority Number of 5 (binary 0101).

During clock cycle 1, units B and C drive the PRI[0] line low, and unit B drives PRI[1] low. All the units 130, 140 are sampling the PRI signals at the end of clock cycle 1. At this stage, units A and C recognize that another unit with a higher priority is requesting bus access. Therefore, units A and C will no longer participate in the arbitration cycle. The group of units that is selected in clock cycle 1 is the units with PNs 0–3. Only one unit of this group requests bus access. During clock cycle 3, this unit C drives PRI[2] low. Again, all units 130, 140 sample the PRI signals at the end of clock cycle 3 to identify the winner.

At the end of the arbitration, all units 130, 140 identify the unit with Priority Number 2 as the winner. All units with Priority Numbers larger than 2 decrement their Priority Numbers. Unit B sets its PN to 14 (lowest priority).

In some embodiments, bus 120 is shared by N units where N is greater than 2. The PRI bus has M lines, where M is greater than 1 and less than N. Each priority number has up to k bits, where $N \leq 2^k - 1$ (one PN is not assigned to any unit to indicate when no unit requests bus access). The units are divided into up to M+1 groups based on k1 MSBs of each unit's priority number, where k1>1. In the first clock cycle of the arbitration cycle, the PRI signals select a group having the highest-priority unit requesting bus access. In some embodiments, the PRI signals are formed as shown in the following table (for each priority number PN, the right column entry consists of PN 1's (no 1's for PN=0), followed by a 0, followed by "don't cares" (but there are no "don't cares" in the last line); this technique is suitable for a wired-OR connection of the units to the PRI lines):

TABLE 3

| Number formed by k1 MSB's of the priority number of a unit requesting bus access | PRI lines (0 means line is asserted by the unit, 1 means not asserted by the unit) |
|---|---|
| 0 | 000 ... 000 |
| 1 | 100 ... 000 |

TABLE 3-continued

| Number formed by k1 MSB's of the priority number of a unit requesting bus access | PRI lines (0 means line is asserted by the unit, 1 means not asserted by the unit) |
|---|---|
| 2 | 110 ... 000 |
| 3 | 111 ... 000 |
| ... | ... |
| $2^{k1}-3$ | 111 ... 100 |
| $2^{k1}-2$ | 111 ... 110 |
| $2^{k1}-1$ | 111 ... 111 |

A group is subdivided into up to $2^{k2}$ subgroups based on the next k2 MSBs of each unit's priority number, where $k2 \geq 1$. In a subsequent period of time, in the selected group, the units requesting bus access assert PRI signals, so that a subgroup is selected having the highest-priority unit requesting bus access. The subgroup is divided into subgroups, and so on, until the winning unit is identified.

The Priority Number of each IU 130 is initially set to the IU's Device Number (DN). Unique device numbers are assigned during the Device Number set up stage during the initialization period after a system reset as follows.

NCI bus 120 includes a data bus SB_D. In addition to transferring data, this bus is used to assign device numbers that are used to access the units. Each IU 130 has an input pin DN connected to a line of bus SB_D. Different DN pins are connected to different SB_D lines. In some embodiments having 14 IUs 130, only the 14 least significant lines of bus SB_D are connected to the DN pins. In some embodiments, the DN pins are reserved for device number assignment and are not used for any other purpose.

During the Device Number set up stage, PSP 140 drives a unique DN onto each bus line connected to a DN pin. Each IU 130 reads the device number on its pin DN into a shift register.

More particularly, the Device Number set up stage lasts four clock cycles 0, 1, 2, 3. During these cycles, PSP 140 asserts PRI[0], PRI[1], PRI[2]. At the same time, PSP 140 provides the following vectors on the 16 least significant bits of bus SB_D:

Clock Cycle 0: SB_D=1111_1111_0000_0000

Clock Cycle 1: SB_D=1111_0000_1111_0000

Clock Cycle 2: SB_D=1100_1100_1100_1100

Clock Cycle 3: SB_D=1010_1010_1010_1010

Thus, the IU 130 connected to SB_D[1] gets DN=1 (binary 0001), the IU 130 connected to SB_D[12] gets DN=12 (binary 1100), and so on.

The Mailbox Channel of PSP 140 is initialized to have DN=0. No IU 130 has its DN pin connected to SB_D[0], and hence no IU 130 has DN=0.

Figure 3:
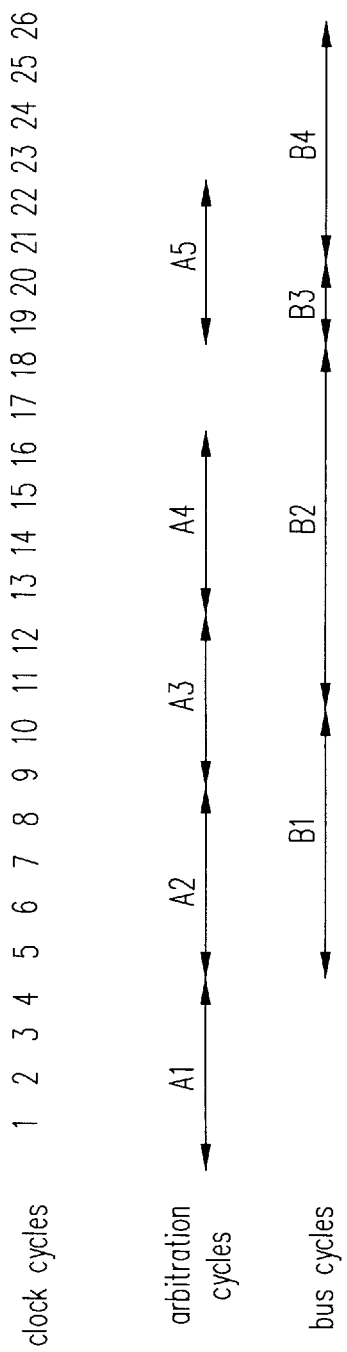
FIGS. 3–4 are timing diagrams illustrating overlapping of arbitration and bus cycles according to the present invention.

In some embodiments, arbitration cycles overlap with bus cycles. In FIG. 3, symbols A1, A2, A3, . . . denote arbitration cycles for respective bus cycles BE, B2, B3 . . . . A bus cycle can take from 2 to 24 clock cycles. A PSP Reply channel transaction takes a bus cycle of 6 clock cycles.

Arbitration cycle A1 takes clock cycles 1–4. Bus cycle B1 takes clock cycles 5–10. Arbitration cycle A2 is performed in parallel with bus cycle B1 in clock cycles 5–8. Arbitration cycles A3 and A4 immediately follow A2 in clocks 9–12 and 13–16 respectively. Bus cycle B2 occurs in clock cycles 11–18. In the embodiment of FIG. 3, at most two arbitration cycles Ai, Ai+1 can be performed before the start of bus cycle Bi. Therefore, arbitration cycle A5 is delayed until the start of bus cycle B3 (in clock cycle 19).

If an arbitration cycle Ai determines that no unit is requesting a bus cycle, arbitration cycle Ai is repeated immediately.

In some embodiments, at most one arbitration cycle can be performed in advance, that is, only Ai, but not Ai+1, can be performed before the start of bus cycle Bi. Ai+1 can start at or after the start of Bi. In some such embodiments, each bus cycle is at least as long as any arbitration cycle. Therefore, bus cycles can follow each other without delay. Indeed, suppose that arbitration cycle Ai+1 starts simultaneously with bus cycle Bi. Since Ai+1 is not longer than Bi, Ai+1 will end no later than Bi. Therefore, Bi+1 can start immediately after Bi and need not be delayed. Ai+2 can start simultaneously with Bi+1, so that Bi+2 will not be delayed; and so on.

Figure 4:
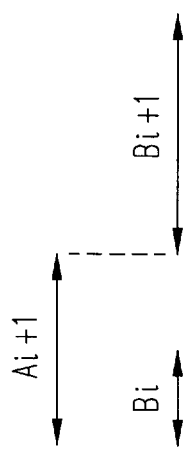

In some embodiments, including the embodiments of FIGS. 3 and 4, a bus cycle can be shorter than an arbitration cycle. In FIG. 4, Bi is shorter than Ai+1. Ai+1 and Bi start at the same time. Since Bi+1 starts only after completion of Ai+1, Bi+1 is delayed from the end of Bi.

To avoid the delay, in some embodiments, the arbitration cycle Ai+1 can start before Bi. Thus, in FIG. 3, A4 starts before B3. Therefore, B4 is not delayed even though B3 is shorter than A4.

In some embodiments, a large proportion of bus cycles are shorter than an average arbitration cycle. The number of arbitration cycles that can be performed in advance (that is, the number of cycles Aj, $j \geq i$, that can be performed before the start of Bi) is made large to reduce or eliminate bus cycle delays. However, increasing the number of arbitration cycles that can be performed in advance increases the amount of storage used to store arbitration results.

The above embodiments illustrate but do not limit the invention. In particular, the invention is not limited to packet switches or to any particular computer system. Further, the invention is not limited to bus arbitration. In some embodiments, the invention is used to arbitrate access to shared resources other than buses. The invention is not limited by the length of arbitration or bus cycles, or by any particular clock speed. In some embodiments, the same PRI signals are driven for more than one clock cycle to identify a winning group or subgroup of units, or for less than an entire clock cycle. Other embodiments and variations are within the scope of the invention, as defined by the appended claims. ADDENDUM 1

NCI bus signals

In the table below, the column "Dir PSP" indicates whether the signal is input, output, or bidirectional (I/O) as viewed from PSP 140. For example, "O" (output) in that column means the signal is generated by PSP 140. Similarly, column "Dir IU" indicates the direction of the signal as viewed from IU 130.

| Signal name | Width | Dir PSP | Dir IU | Function |
| --- | --- | --- | --- | --- |
| SB_D [31:0] | 32 | I/O | I/O | NCI Bus Data |
| SB_P | 1 | I/O | I/O | NCI Bus Parity Parity covers the 32 bits of Data |
| SB_C | 1 | I/O | I/O | NCI Bus Control This signal is used to distinguish between a control portion of bus transaction and a data portion. |
| SB_ACT_ | 1 | I/O | I/O | NCI Bus Active The current bus |

-continued

| Signal name | Width | Dir PSP | Dir IU | Function |
| --- | --- | --- | --- | --- |
| | | | | Master should drive this signal low during the transaction period. |
| SB_QWT_ | 1 | I/O | I/O | NCI Bus PSP Wait Asserted by the PSP when it requires (or inserts) a wait cycle |
| SB_IWT_ | 1 | I/O | I/O | NCI Bus IU Wait Asserted by the IU when it requires (or inserts) a wait cycle |
| SB_QABRT_ | 1 | O | I/O | NCI Bus PSP Abort Asserted by the PSP when it is unable to process the IU transaction |
| SB_IABRT_ | 1 | I | I/O | NCI Bus IU Abort Asserted by the IU when it is unable to process the PSP transaction |
| SB_PRI | 3 | I/O | I/O | NCI Bus Priority These signals are used for bus arbitration |
| SB_REQ_ | 1 | O | I | NCI Bus Request Asserted by the PSP when it requires a bus transaction |

I claim:

1. A unit U1 suitable for sharing a resource with other units, the unit U1 comprising:

means for connecting the unit U1 to a bus comprising a plurality of conductive lines; and arbitration means for performing the following function:

in a first period of time when the unit U1 requests access to the resource, providing to the bus, simultaneously, a first multiple-bit indication of a first plurality of bits of the priority number of the unit U1, to enable the bus to indicate, at the end of the first period of time, a value B1 of the first plurality of bits of the priority number of the highest-priority unit requesting access to the resource, wherein each bit of the first indication is provided to a separate conductive line of the bus; then in a second period of time, (a) if the first plurality of bits of the priority number of the unit U1 have the value B1, providing to the bus a second indication of at least one second bit of the priority number of the unit U1 but not of the first plurality of bits of the priority number of the unit U1, to enable the bus to indicate, at the end of the second period of time, a value B2 of the at least one second bit of the priority number of the highest-priority unit requesting access to the bus, wherein at no single moment of time an indication of all the bits of the priority number of the unit U1 is provided to the bus, and (b) if the first plurality of bits of the priority number of the unit U1 have a value different from B1, then not competing for access to the resource; and if the unit U1 is the highest-priority unit requesting access to the bus, then setting the priority of the unit U1 to the lowest priority.

2. The system of claim 1 wherein when the unit U1 is granted an access to the resource in the presence of one or more units U2 which had lower priorities than the unit U1 before the unit U1's priority was set to the lowest priority, the priorities of the units U2 are increased.

3. The system of claim 2 wherein when the unit U1 is granted an access to the resource in the presence of one or more units U3 which had a higher priority than the unit U1 before the unit U1's priority was set to the lowest priority, the priorities of the units U3 remain unchanged.

4. The system of claim 1 wherein the resource is a bus.

5. The unit U1 of claim 1 wherein the first plurality of bits are the most significant bits of the priority number of the unit U1.

6. The unit U1 of claim 1 in combination with the bus and the other units.

7. The unit U1 of claim 6 wherein the units are connected to the bus by a wired-OR connection.

8. The unit U1 of claim 1 wherein the first indication has as many bits as there are conductive lines in the bus.

9. The unit U1 of claim 1 wherein the bus has fewer conductive lines than there are bits in each unit's priority number.

10. The system of claim 1 wherein the second indication is a multiple-bit indication each bit of which is provided to a separate conductive line of the bus in the second period of time.

11. A method for a plurality of units to share a resource, the method comprising:

in a first period of time, each unit requesting access to the resource providing to a bus, simultaneously, a first multiple-bit indication of a first plurality of bits of the unit's priority number, wherein each bit of the first indication is provided to a separate conductive line of the bus, so that at the end of the first period of time, the bus indicates a value B1 of the first plurality of bits of the highest-priority unit requesting access to the resource; then in a second period of time, for each unit requesting access to the resource, if the first plurality of bits of the unit's priority number has the value B1, then the unit providing to the bus, simultaneously, a second indication of at least one second bit of the unit's priority number but not of the first plurality of bits of the unit's priority number, so that at the end of the second period of time, the bus indicates a value B2 of the at least one second bit of the highest-priority unit requesting access to the resource, wherein at no single moment of time an indication of all the bits of the priority number of a unit is provided to the bus;

selecting the highest-priority unit U1 requesting access to the resource from units whose priority numbers have the first plurality of bits having the value B1 and the at least one second bit having the value B2, and allowing the selected unit U1 to access the resource, and setting the priority of the selected unit U1 to the lowest priority.

12. The method of claim 11 further comprising, for each unit U2 that had a lower priority than the unit U1 before the priority of the unit U1 was selected, increasing the priority of unit U2.

13. The method of claim 12 wherein for each unit U3 which had a higher priority than the unit U1 before the priority of the unit U1 was set to the lowest priority, the priority of unit U3 remains unchanged.

14. The method of claim 12 wherein each priority is represented by a number, with lower numbers representing higher priorities.

15. The method of claim 11 wherein the resource is a bus.

16. The method of claim 11 wherein the first plurality of bits of each priority number are the most significant bits of the priority number.

17. The method of claim 11 wherein the units are connected to the bus by a wired-OR connection.

18. The method of claim 11 wherein the first indication has as many bits as there are conductive lines in the bus.

19. The method of claim 11 wherein the bus has fewer conductive lines than there are bits in each unit's priority number.

20. The method of claim 11 wherein the second indication is a multiple-bit indication each bit of which is provided to a separate conductive line of the bus in the second period of time.

21. A method for a plurality of units to share a resource, the method comprising:

conducting a plurality of arbitration operations ARB wherein each arbitration operation ARB selects a unit which is to access the resource in a corresponding resource access operation R(ARB), wherein for each arbitration operation ARB the corresponding resource access operation R(ARB) starts immediately after the arbitration operation ARB if the resource is available at a time immediately after the arbitration operation ARB, but the resource access operation R(ARB) is delayed from the end of the arbitration operation ARB if another resource access operation has not completed at the time immediately after the arbitration operation ARB; and performing the resource access operations R(ARB);

wherein for at least two arbitration operations ARB1 and ARB2 such that the resource access operation R(ARB1) precedes the resource access operation R(ARB2), the arbitration operation ARB2 starts before the resource access operation R(ARB1).

22. The method of claim 21 wherein the arbitration operations ARB1, ARB2 overlap with at least one resource access operation R(ARB) other than R(ARB1) and R(ARB2).

23. The method of claim 21 wherein the arbitration operation ARB2 is completed by the start of the resource access operation R(ARB1).

24. The method of claim 21 wherein the arbitration operations ARB occur in sequence one after another, and the resource access operations R(ARB) occur in sequence in the order of the corresponding arbitration operations, and at least one resource access operation is shorter than at least one arbitration operation, and at least one resource access operation is longer than at least one arbitration operation.

25. The method of claim 21 wherein at most one unit accesses the resource at any given time.

26. The method of claim 21 wherein the resource is a bus.

27. The method of claim 26 wherein at least some of the units are interface units each connected to at least one network segment.

28. A system comprising:

a plurality of units;

a resource accessible to the units; and circuitry for conducting a plurality of arbitration operations ARB wherein each arbitration operation ARB selects a unit which is to access the resource in a corresponding resource access operation R(ARB), wherein for each arbitration operation ARB the corresponding resource access operation R(ARB) starts immediately after the arbitration operation ARB if the resource is available at a time immediately after the arbitration operation ARB, but the resource access operation R(ARB) is delayed from the end of the arbitration operation ARB if another resource access operation has not completed at the time immediately after the arbitration operation ARB;

wherein if a resource access operation R(ARB) is delayed from the end of a corresponding arbitration operation ARB, then at least one arbitration operation ARB-1 following the operation ARB is to start before the resource access operation R(ARB).

29. The system of claim 28 wherein if the resource access operation R(ARB) is delayed from the end of a corresponding arbitration operation ARB by another resource access operation R1, then at least one arbitration operation ARB-1 following the operation ARB is to overlap with said other resource access operation R1.

30. The system of claim 28 wherein if the resource access operation R(ARB) is delayed from the end of a corresponding arbitration operation ARB sufficiently long, then at least one arbitration operation ARB-1 following the operation ARB is allowed to complete by the start of the operation R(ARB).

31. The system of claim 28 wherein the arbitration operations are to be performed in sequence one after another, the resource access operations are to be performed in sequence in the order of the corresponding arbitration operations, the system allows a resource access operation to be shorter than an arbitration operation, and the system also allows a resource access operation to be longer than an arbitration operation.

32. The system of claim 28 wherein at most one unit is allowed to access the resource at any given time.

33. The system of claim 28 wherein the resource is a bus.

34. The system of claim 33 wherein the system comprises a network switch and at least some of the units are interface units each connected to at least one network segment.

* * * * *